United States Patent
Du et al.

(10) Patent No.: US 12,376,032 B2
(45) Date of Patent: Jul. 29, 2025

(54) ENERGY-SAVING CONFIGURATION METHOD AND APPARATUS, ENERGY-SAVING METHOD AND APPARATUS, COMMUNICATION NODE, AND STORAGE MEDIUM

(71) Applicant: ZTE CORPORATION, Shenzhen (CN)

(72) Inventors: Weiqiang Du, Shenzhen (CN); Wei Luo, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 413 days.

(21) Appl. No.: 17/995,625

(22) PCT Filed: Mar. 3, 2021

(86) PCT No.: PCT/CN2021/078820
§ 371 (c)(1),
(2) Date: Oct. 6, 2022

(87) PCT Pub. No.: WO2021/203872
PCT Pub. Date: Oct. 14, 2021

(65) Prior Publication Data
US 2023/0217368 A1    Jul. 6, 2023

(30) Foreign Application Priority Data
Apr. 9, 2020    (CN) .................. 202010275663.X (51) Int. Cl.
*H04B 17/327*    (2015.01)
*H04B 17/382*    (2015.01)
(Continued)

(52) U.S. Cl.
CPC ... *H04W 52/0219* (2013.01); *H04W 52/0235* (2013.01)

(58) Field of Classification Search
CPC ......... H04W 52/0219; H04W 52/0235; H04W 52/0206; H04W 8/24; H04W 92/18;
(Continued)

(56) References Cited

U.S. PATENT DOCUMENTS

| | | | |
|---|---|---|---|
| 11,895,520 B2* | 2/2024 | Gunnarsson | ........ H04W 56/007 |
| 2018/0042023 A1 | 2/2018 | Sheng | |

(Continued)

FOREIGN PATENT DOCUMENTS

| | | |
|---|---|---|
| CN | 104469859 A | 3/2015 |
| CN | 110140402 A | 8/2019 |

(Continued)

OTHER PUBLICATIONS

International Searching Authority. International Search Report and Written Opinion for PCT Application No. PCT/CN2021/078820 and English translation, mailed Apr. 30, 2021, pp. 1-12.

(Continued)

*Primary Examiner* — Christopher M Crutchfield
*Assistant Examiner* — Syed Ahmed
(74) *Attorney, Agent, or Firm* — Vivacqua Crane, PLLC (57) ABSTRACT

Disclosed are an energy-saving configuration method and apparatus, an energy-saving method and apparatus, a communication node, and a non-transitory computer-readable storage medium. The energy-saving configuration method may include: receiving user equipment (UE) energy-saving information sent by a second communication node; and sending energy-saving configuration information to the second communication node according to the UE energy-saving information.

16 Claims, 3 Drawing Sheets

(51) Int. Cl.
  *H04W 8/24* (2009.01)
  *H04W 52/02* (2009.01)
  *H04W 72/02* (2009.01)
  *H04W 72/542* (2023.01)
  *H04W 92/18* (2009.01)

(58) Field of Classification Search
  CPC ..... H04W 24/08; H04W 24/10; H04W 72/02; H04W 72/21; H04W 72/51; H04W 72/542; H04B 17/327; H04B 17/382; Y02D 30/70
  USPC .......................................................... 370/311
  See application file for complete search history.

(56) References Cited

U.S. PATENT DOCUMENTS

2020/0008266 A1* 1/2020 Pan ..................... H04L 1/1642
2020/0037358 A1 1/2020 Chae et al.
2020/0092818 A1 3/2020 Jiang et al.
2021/0219268 A1* 7/2021 Li ....................... H04B 17/318

FOREIGN PATENT DOCUMENTS

| CN | 110536260 A | 12/2019 | |
|---|---|---|---|
| CN | 110651440 A | 1/2020 | |
| CN | 110786062 A | 2/2020 | |
| CN | 110832890 A | 2/2020 | |
| CN | 111901785 A | 11/2020 | |
| WO | WO-2019182428 A1 * | 9/2019 | ........... H04W 52/02 |

OTHER PUBLICATIONS

European Patent Office. Partial Supplementary European Search Report for EP Application No. 21784196.4, mailed Mar. 28, 2024, pp. 1-12.

* cited by examiner

ENERGY-SAVING CONFIGURATION METHOD AND APPARATUS, ENERGY-SAVING METHOD AND APPARATUS, COMMUNICATION NODE, AND STORAGE MEDIUM

CROSS-REFERENCE TO RELATED APPLICATION

This application is a national stage filing under 35 U.S.C. § 371 of international application number PCT/CN2021/078820, filed Mar. 3, 2021, which claims priority to Chinese patent application No. 202010275663.X, filed Apr. 9, 2020. The contents of this international application are incorporated herein by reference in their entirety.

TECHNICAL FIELD

The present disclosure relates to the field of wireless communication networks, for example, relates to an energy-saving configuration method and apparatus, an energy-saving method and apparatus, a communication node and a non-transitory computer-readable storage medium.

BACKGROUND

With the development of wireless multimedia services, there is an increasing demand for high data rate and user experience, and application scenarios such as public security, social network, close-range data sharing, local advertising, and the like have greatly increased the demand for people to know and communicate with others or things nearby (Proximity Services). Under this background, a Device-to-Device (D2D) communication technology can reduce the burden of a cellular network, improve data rate, and meet the requirements of high data rate services and proximity services. D2D technology is also called Proximity Services (ProSe), or Sidelink (SL) communication. In the SL communication of New Radio (NR), users also expect user equipment to have good endurance capability. However, the time of data transmission between devices cannot be determined through negotiation, so the user equipment needs to continuously monitor a data receiving channel to assist in the selection of transmission resources, resulting in great power consumption.

SUMMARY

The present disclosure provides an energy-saving configuration method and apparatus, an energy-saving method and apparatus, a communication node and a non-transitory computer-readable storage medium, to reduce power consumption of user equipment.

An embodiment of the present disclosure provides an energy-saving configuration method, which is applied to a first communication node. The method may include: receiving User Equipment (UE) energy-saving information sent by a second communication node; and sending energy-saving configuration information to the second communication node according to the UE energy-saving information.

An embodiment of the present disclosure provides an energy-saving method, which is applied to a second communication node. The method may include: sending UE energy-saving information to a first communication node; receiving energy-saving configuration information sent by the first communication node; and performing measurement on a target resource pool according to the energy-saving configuration information.

An embodiment of the present disclosure provides an energy-saving configuration apparatus. The apparatus may include: an energy-saving information receiving module configured to receive UE energy-saving information sent by a second communication node; and a configuration information sending module configured to send energy-saving configuration information to the second communication node according to the UE energy-saving information.

An embodiment of the present disclosure provides an energy-saving apparatus. The apparatus may include: an energy-saving information sending module configured to send UE energy-saving information to a first communication node; a configuration information receiving module configured to receive energy-saving configuration information sent by the first communication node; and a measurement module configured to perform measurement on a target resource pool according to the energy-saving configuration information.

An embodiment of the present disclosure provides a communication node. The node may include: at least one processor; and a storage device configured to store at least one program which, when executed by the at least one processor, cause the at least one processor to perform the above-mentioned energy-saving configuration method or energy-saving method.

An embodiment of the present disclosure provides a non-transitory computer-readable storage medium storing a computer program which, when executed by a processor, causes the processor to perform the above-mentioned energy-saving configuration method or energy-saving method.

DETAILED DESCRIPTION

The present disclosure will be described below with reference to the accompanying drawings and embodiments.

In the D2D technology, an interface between devices is a PC5 interface. The time of data transmission between devices cannot be determined through negotiation, so a user equipment (UE) needs to continuously monitor a data receiving channel to assist in the selection of transmission resources, resulting in great power consumption. Requirements for energy-saving of UE are not considered in an NR sidelink communication system.

In an embodiment of the present disclosure, an energy-saving configuration method is provided, which is applied to a first communication node. The first communication node may provide related energy-saving configuration information for a second communication node according to UE energy-saving information of the second communication node, and flexibly instruct the second communication node to operate according to the energy-saving configuration information, so as to meet requirements for energy-saving of UE and reduce power consumption of the UE.

Figure 1:
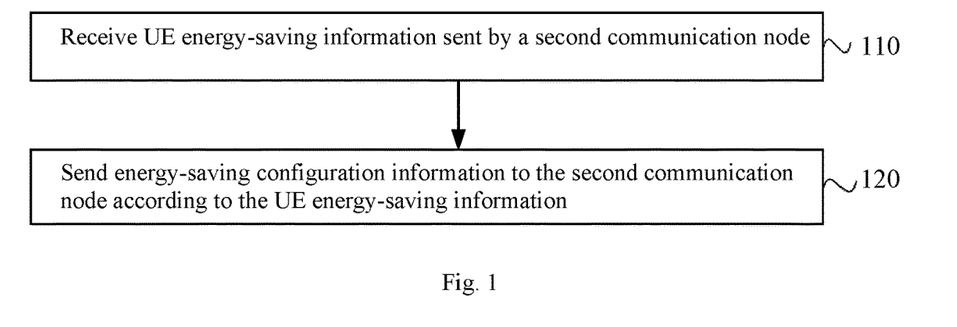
FIG. 1 is a flowchart of an energy-saving configuration method provided by an embodiment.

FIG. 1 is a flowchart of an energy-saving configuration method provided by an embodiment. As shown in FIG. 1, the method includes steps S110 and S120.

At S110, UE energy-saving information sent by a second communication node is received.

At S120, energy-saving configuration information is sent to the second communication node according to the UE energy-saving information.

In this embodiment, the first communication node may be a serving node (e.g., a base station), and the second communication node may be a target UE. Alternatively, the first communication node may be a first UE, i.e., a Transport (TX) UE in Sidelink unicast communication, and the second communication node may be a second UE, i.e., a Receive (RX) UE in the Sidelink unicast communication. The second communication node sends its UE energy-saving information to the first communication node, which can be utilized to report related resource selection modes, whether measurement on a resource pool is supported, whether there are energy-saving requirements, energy-saving levels, and the like. The first communication node can provide energy-saving configuration information for the second communication node according to the received UE energy-saving information, such as configuring how the second communication node performs resource pool measurement and selects resources, so as to reduce the power consumption of the second communication node.

In an embodiment, the first communication node is a serving node, and the second communication node is a target UE.

In an embodiment, the UE energy-saving information includes at least one of UE capability information or UE status information, where the UE capability information includes UE capability information of the target UE. The UE status information includes at least one of: UE status information of the target UE; UE capability information of a peer UE communicating with the target UE; or UE status information of the peer UE communicating with the target UE.

In this embodiment, the target UE can report its own UE capability information and/or UE status information to the serving node to inform the serving node of corresponding energy-saving requirements, and the serving node can issue reasonable energy-saving configuration information according to the information reported by the target UE. In addition, in the Sidelink unicast communication, the TX UE can send a Reference Signal Receiving Power (RSRP) measurement configuration to the RX UE. In this embodiment, in the case where the first communication node is a serving node and the target UE is a TX UE, the UE status information and/or UE capability information of the peer UE (in this case, RX UE) communicating with the target UE are also reported to the serving node of the target UE, such that both the target UE and the peer UE can obtain reasonable energy-saving configuration information.

In an embodiment, the UE capability information of the target UE includes at least one of: a resource selection mode supported by the target UE, where the resource selection mode includes a random selection mode and a partial sensing mode; or whether the target UE supports measurement on a target resource pool, where the target resource pool includes at least one of: a transmission resource pool utilized for the target UE to transmit data; or a non-transmission resource pool not utilized for the target UE to transmit data.

In this embodiment, in the case of there being energy-saving requirements, in addition to perceiving on a configured transmission resource pool, the target UE can select resources by means of the random selection mode or partial sensing mode. Compared with perceiving and selecting from all resources in the transmission resource pool, these two resource selection modes reduce the power consumption of the UE. On this basis, the target UE can report the resource selection mode supported by the target UE to the serving node for the serving node to perform energy-saving configuration. In addition, the target UE needs to adjust a transmission parameter when transmitting data. The adjustment on the transmission parameter is based on measurement on the transmission resource pool, while measurement on the resource pool requires constant monitoring of the transmission resource pool, which is an operation with high energy consumption. In this embodiment, the target UE with energy-saving requirements may not have the capability to measure the resource pool. On this basis, the target UE can report, to the serving node, whether the target UE supports measurement on the target resource pool, measurement on the transmission resource pool utilized for the target UE to transmit data, and/or measurement on the non-transmission resource pool not utilized for the target UE to transmit data.

In an embodiment, the UE status information of the target UE includes at least one of: a type of the target UE, where the type includes a Vehicle UE (V-UE) and a Pedestrian UE (P-UE); energy-saving requirement information of the target UE; an energy-saving level of the target UE; or whether the target UE requires the serving node to provide a Channel Busy Rate (CBR) value of the target resource pool.

In this embodiment, the energy-saving requirement information is configured to indicate whether the target UE requires energy saving. The serving node can perform energy-saving configuration on the target UE according to the type, energy-saving requirement information and energy-saving level of the target UE, and whether the CBR value needs to be provided.

In an embodiment, the UE status information of the peer UE includes at least one of: a type of the peer UE, where the UE type includes a V-UE and a P-UE; energy-saving requirement information of the peer UE; or an energy-saving level of the peer UE.

In an embodiment, the UE capability information of the peer UE includes at least one of: whether the peer UE supports measurement on the transmission resource pool; or whether the peer UE supports measurement on the non-transmission resource pool.

In an embodiment, the UE status information is transmitted through Sidelink UE information. In an embodiment, the method further includes a step S101.

At S101, UE capability query information is sent to the second communication node, where the UE capability query information is utilized to query whether the second communication node supports measurement on the target resource pool.

In this embodiment, the first communication node sends UE capability query information to the second communication node, to query whether the second communication node supports measurement on the target resource pool and the resource selection mode supported by the second communication node, and the second communication node reports UE capability information accordingly.

In the above-mentioned embodiment, the serving node can send the energy-saving configuration information to the target UE by issuing a Radio Resource Control (RRC) reconfiguration message.

In an embodiment, the first communication node is a first UE, and the second communication node is a second UE.

In this embodiment, the first UE refers to a TX UE, and the second UE refers to an RX UE. In an embodiment, the UE energy-saving information includes at least one of: UE capability information of the second UE, or UE status information of the second UE.

In an embodiment, the UE energy-saving information includes UE capability information of the second UE. The UE capability information of the second UE includes whether the second UE supports measurement on the target resource pool, where the target resource pool includes at least one of: a transmission resource pool utilized for the second UE to transmit data; or a non-transmission resource pool not utilized for the second UE to transmit data.

In an embodiment, the method further includes a step S102.

At S102, UE capability query information is sent to the second communication node.

In this embodiment, the first UE sends the UE capability query information to the second UE, so as to query whether the second UE supports measurement on the target resource pool and the resource selection mode supported by the second UE.

In an embodiment, the UE energy-saving information includes UE status information of the second UE. The UE status information of the second UE includes at least one of: a type of the second UE, where the type includes a V-UE and a P-UE; energy-saving requirement information of the second UE; or an energy-saving level of the second UE.

In an embodiment, receiving UE energy-saving information sent by a second communication node includes: receiving UE status information sent by the second communication node through a Sidelink interface PC5-S signaling in a unicast connection establishment stage; or receiving UE status information sent by the second communication node through a PC5 RRC signaling.

In an embodiment, the method further includes a step S103.

At S103, UE status query information is sent to the second communication node through a PC5-S signaling in a unicast connection establishment stage; or UE status query information is sent to the second communication node through a PC5 RRC message.

In this embodiment, the first UE sends the UE status query information to the second UE, so as to query the type, energy-saving requirement information and energy-saving level of the second UE.

In an embodiment, the method further includes a step S104.

At S104, in the case where the second UE has energy-saving requirements, configuration information is adjusted, where the energy-saving configuration information includes at least one of: bearer configuration; transmission parameter configuration; or measurement configuration.

In this embodiment, by receiving the UE status information of the second UE, the first UE can adjust the configuration of the second UE upon finding that the second UE has energy-saving requirements, that is, adjust the bearer configuration, transmission parameter configuration and/or measurement configuration of the second UE.

In an embodiment, the energy-saving configuration information is determined by the first communication node according to a configuration of the serving node, a system message or pre-configured information.

In this embodiment, the first UE acquires a resource pool configuration and a measurement configuration from the base station, the system message and the pre-configured information, and issue the resource pool configuration and the measurement configuration to the second UE. Where to obtain the configuration can be determined according to a status of the first UE, for example, the first UE in a connected status acquires the configuration from the serving node; the first UE in an IDLE or INACTIVE status acquires the configuration from the system message, and the first UE outside the coverage of the serving node adopts a pre-configured configuration.

In an embodiment, the energy-saving configuration information includes at least one of: resource pool configuration; or measurement configuration.

In this embodiment, energy-saving related configurations, such as supported resource selection modes, default transmission parameters, and the like can be indicated in the resource pool configuration. The measurement configuration includes measurement configuration for RSRP or CBR, and the like, where each measurement configuration includes a measurement object configuration item, a measurement report configuration item, a measurement identifier configuration item and a measurement parameter.

In an embodiment, the resource pool configuration includes at least one of: 1) a resource selection mode of a respective resource pool, where the resource selection mode includes a random selection mode and a partial sensing mode; 2) whether a respective resource pool adopts a CBR measurement result issued by the serving node; 3) a default CBR value of a respective resource pool; 4) a default transmission parameter utilized by a respective resource pool; 5) whether a respective resource pool is a non-transmission resource pool; or 6) an identifier of a respective resource pool.

In an embodiment, the measurement configuration includes at least one of: 1) measurement configuration information for Reference Signal Receiving Power (RSRP); 2) measurement configuration information for CBR; 3) a UE destination Identifier (ID) corresponding to the measurement configuration; or 4) a UE destination ID list applicable to the measurement configuration.

The measurement configuration issued by the serving node to the first UE may be for the first UE or the second UE, and may also be applicable to the first UE and/or the second UE. In this embodiment, the serving node can indicate the measurement configuration information for RSRP and/or CBR in the measurement configuration, and can also indicate the UE destination ID corresponding to the measurement configuration and/or the UE destination ID list applicable to the measurement configuration.

In an embodiment, the measurement configuration information for RSRP includes at least one of: whether the measurement configuration information for RSRP is utilized for energy saving; or an energy-saving level applicable to the measurement configuration information for RSRP.

In this embodiment, the measurement configuration includes the measurement configuration information for RSRP, which indicates whether the measurement configuration information for RSRP is utilized for energy saving and an applicable energy-saving level, thereby improving the flexibility of energy-saving configuration and reducing power consumption.

In an embodiment, the measurement configuration information for CBR includes at least one of: addition or removal of a measurement object configuration item; addition or removal of a measurement report configuration item; addition or removal of a measurement identifier configuration item; or a measurement parameter.

In this embodiment, measurement parameter configuration information for CBR is added to the measurement configuration to improve the flexibility of energy-saving configuration. The measurement object configuration item is utilized to indicate what the second UE needs to measure. For example, in RSRP measurement, the measurement object may be a frequency channel number, and in CBR measurement, the measurement object may be a resource pool. The measurement report configuration item can be utilized to indicate when and how to trigger the generation and reporting of a measurement report after the measurement is finished, and what to report. Reporting may include reporting, by the second UE, a measurement result to the first UE, and reporting, by the first UE, a measurement result to the base station. The measurement identifier configuration item can be utilized to associate one measurement object with one measurement report. The measurement parameter refers to what can be measured for the measurement object. For example, if the measurement object is a frequency channel number, the content that can be measured includes RSRP, Reference Signal Receiving Quality (RSRQ), and the like, and if the measurement object is a resource pool, the content that can be measured is a CBR value.

In an embodiment, the measurement identifier configuration item includes at least one of: a measurement ID; a measurement report ID; a measurement object ID; whether the measurement configuration information for CBR is utilized for energy saving; or an energy-saving level applicable to the measurement configuration information for CBR.

In an embodiment, a measurement report configuration item for CBR includes at least one of: a measurement report ID; a UE corresponding to the measurement report (i.e., indicating whether the measurement report is sent to the base station by the first UE or sent to the first UE by the second UE); a report cycle of CBR; a report trigger event of CBR, where the trigger event includes a first event and a second event, the first event includes a CBR value being greater than or equal to a first threshold, and the second event includes a CBR value being less than or equal to a second threshold; a threshold (the first threshold and/or the second threshold) corresponding to the report trigger event; a measurement parameter to be reported; a reporting mode, where the reporting mode includes reporting an index in a CBR range list and reporting a CBR value; a report destination (i.e. the first UE sends the measurement report to the base station, or the second UE sends the measurement report to the first UE); or a processing mode of multiple measurement results, where the processing mode includes reporting multiple measurement results or reporting one measurement result (that is, in the case where there are multiple second UEs, multiple measurement results are obtained, and one or more measurement results may be configured and reported by means of the processing mode).

In an embodiment, the measurement object configuration item includes a measurement object ID; a target resource pool ID; a target resource pool configuration; and whether the target resource pool is a transmission resource pool.

In an embodiment, the measurement parameter includes a CBR value.

In an embodiment, the method further includes a step S130.

At S130, a measurement report sent by the second communication node is received.

In an embodiment, the measurement report includes at least one of: a measurement ID; a measurement value of the measurement parameter; a CBR value; an index in a CBR range list; a destination ID of a UE reporting the measurement value; or location information of the UE reporting the measurement value.

In this embodiment, the first UE sends the measurement report to the base station, alternatively the second UE sends the measurement report to the first UE. By including the destination ID and/or location information of the UE reporting the measurement value in the measurement report, whether the measurement report is reported by the first UE or the second UE can be distinguished, so as to improve the reliability of energy-saving configuration. In addition, the mode of reporting CBR is also flexible, such as reporting the CBR value or the index in the CBR range list, improving the flexibility of an energy-saving configuration process.

In an embodiment, the measurement report is sent through at least one of: an RRC message; or a Media Access Control Control Element (MAC CE) message.

In an embodiment, the energy-saving configuration information is sent through at least one of: an RRC message; or an MAC CE message.

In an embodiment, the number of the second UEs is at least two. S120 includes: instructing, by sending a measurement configuration, one of the second UEs to perform measurement on the target resource pool. Correspondingly, the measurement report of the second UE contains a CBR measurement value, and a transmission parameter corresponding to the CBR measurement value is utilized for data transmission of all the second UEs.

In the case where the first communication node is a first UE and the second communication node is a second UE, the first UE with energy-saving requirements may select a second UE to perform the CBR measurement. Usually, CBR measurement is performed by a second UE in unicast connection with the first UE. However, if the second UE has energy-saving requirements or has no CBR measurement capability, measurement cannot be performed. In this embodiment, the first UE can actively select a nearby UE that can perform CBR measurement on a resource pool to establish a connection, to allow this UE to perform measurement on the resource pool. If no UE with CBR measurement capability is found, that the base station needs to provide a CBR value of a resource pool is to be indicated in the UE status information reported to the serving node, according to the above-mentioned embodiments.

In this embodiment, the first UE selects and instructs a second UE with CBR measurement capability to perform CBR measurement, and the first UE receives a measurement report reported by the second UE, where the measurement report corresponds to a CBR measurement value, and a transmission parameter corresponding to the CBR measurement value can be utilized for data transmission of all second UEs.

In an embodiment, the number of the second UEs is at least two. S120 includes: instructing, by sending a measurement configuration, at least two second UEs to perform measurement on the target resource pool. Correspondingly, the measurement report of each second UE contains a CBR measurement value, and a transmission parameter corresponding to each CBR measurement value is utilized for data transmission of a corresponding second UE.

In this embodiment, the first UE can instruct multiple second UEs with CBR measurement capability to perform CBR measurement, each second UE reports a measurement report to the first UE, and each measurement report corresponds to a CBR measurement value. In the process of data transmission of a respective one of the second UEs, a CBR measurement value in the measurement report reported the by the respective second UE can be selected for the respective second UE, or one of all CBR measurement values can be selected for data transmission of each second UE.

In an embodiment, the method further includes a step S140.

At S140, a maximum CBR value is selected from the measurement reports of all second UEs as a CBR measurement result of the target resource pool; or a CBR measurement value in the measurement report of each second UE and a set layer destination ID of each second UE are recorded, and a CBR measurement value in a corresponding measurement report of the second UE is selected as a CBR measurement result of the target resource pool in the process of data transmission.

In this embodiment, the first UE instructs multiple second UEs with CBR measurement capability to perform CBR measurement, and receives a plurality of measurement reports. A maximum CBR value can be selected from all measurement reports as a CBR measurement result of the target resource pool, or the CBR measurement values in all measurement reports can be recorded. In addition, a Layer 2 destination ID (Layer2 DST ID) of each second UE can be recorded. In the process of data transmission of each second UE, a CBR measurement value in a corresponding measurement report can be found for the second UE as a final CBR measurement result.

In an embodiment, the method further includes a step S150.

At S150, a UE with CBR measurement capability is selected as the second UE through a broadcast message or a multicast message, and a connection is established with the second UE. On this basis, the second UE is instructed to perform measurement on the target resource pool.

In this embodiment, the first UE sends a broadcast message, where the broadcast message includes a resource pool measurement request, and the resource pool measurement request includes a CBR measurement request. A UE with CBR measurement capability can respond to the broadcast message, and include an indication about whether the UE can assist in performing resource pool measurement in a response message. After receiving the broadcast response message from the UE, the first UE can establish a unicast connection with the UE, take the UE as the second UE, and instruct the UE to perform resource pool measurement.

Alternatively, the first UE sends a multicast message, where the multicast message includes a resource pool measurement request. The resource pool measurement request includes a CBR measurement request. Other UE(s) with CBR measurement capability can respond to the multicast message, and include an indication about whether the UE can assist in performing resource pool measurement in a response message. After receiving multicast response messages from other UE(s), the first UE can establish a unicast connection with a respective UE, take the UE as the second UE, and instruct the UE to perform resource pool measurement.

Alternatively, the first UE receives a broadcast message sent by a UE with CBR measurement capability, where the broadcast message includes an instruction about whether the UE can assist in performing resource pool measurement. After receiving a broadcast response message from the UE, the first UE can establish a unicast connection with the UE, take the UE as the second UE, and instruct the UE to perform resource pool measurement.

Alternatively, the first UE receives a multicast message sent by a UE with CBR measurement capability, where the multicast message includes an instruction about whether the UE can assist in performing resource pool measurement. After receiving a multicast response message from the UE, the first UE may establish a unicast connection with the UE, take the UE as the second UE, and instruct the UE to perform resource pool measurement.

In an embodiment, S150 includes: preferentially selecting a member UE in a group as the second UE, in the case of multiple UEs having CBR measurement capability. Sidelink supports unicast, groupcast and broadcast communication, and the group described herein is a communication group of UEs interested in the same groupcast service.

In this embodiment, if broadcast response messages or multicast response messages from multiple UEs are received, a member UE in a group is preferentially selected as the second UE for resource pool measurement.

In an embodiment, the method further includes a step S160.

At S160, in the case where a CBR value of the transmission resource pool is not obtained, data is transmitted according to a default CBR value or default transmission parameter provided by the transmission resource pool; or in the case where the CBR value of the transmission resource pool is not obtained, a transmission parameter is determined autonomously and data is transmitted according to the transmission parameter.

The first UE sends the measurement configuration to the second UE, and the second UE performs CBR measurement. The CBR value can be utilized for the first UE to adjust the transmission parameter. In the measurement process by the second UE, the first UE has not received a valid CBR measurement value. In this embodiment, in the case where the first UE does not or cannot obtain a valid CBR measurement value of the resource pool, if the resource pool provides a default CBR value or a default transmission parameter, the default transmission parameter can be utilized to realize data transmission, or the transmission parameter can be autonomously determined by the first UE, thereby ensuring the validity of the CBR and the transmission parameter and improving the flexibility and reliability of data transmission.

Application scenarios of an example energy-saving configuration method are as follows.

Scenario 1: A first UE in a connected status performs a broadcast data transmission service. The method includes following steps S1 to S5.

At S1, the first UE sends UE status information to a serving node to request the serving node to provide a CBR value.

At S2, the first UE sends UE capability information to the serving node.

At S3, energy-saving configuration information issued by the serving node is received.

At S4, if a resource pool configuration issued by the serving node indicates that the serving node cannot provide CBR measurement on the resource pool, a UE that can provide the CBR value is searched for through a broadcast message or a multicast message, and a unicast connection is established with the member UE.

At S5, the UE with which the unicast connection is established performs measurement on the resource pool.

Scenario 2: A first UE in a connected status performs a multicast data transmission service. The method includes following steps S1 to S5.

At S1, the first UE sends UE status information to a serving node to request the serving node to provide a CBR value.

At S2, the first UE sends UE capability information to the serving node.

At S3, energy-saving configuration information issued by the serving node is received.

At S4, if a resource pool configuration issued by the serving node indicates that the serving node cannot provide CBR measurement on the resource pool, a member UE in a group that can provide the CBR value is preferentially searched for through a multicast message, and a unicast connection is established with the member UE; if the member in the group cannot provide a CBR measurement value, a UE that can provide the CBR value is searched for through the broadcast message and a connection is established with the UE.

At S5, the UE with which the unicast connection is established performs measurement on the resource pool.

Scenario 3: A first UE in a connected status in unicast communication has energy-saving requirements. The method includes following steps S1 to S5.

At S1, the first UE queries UE capability information and UE status information of all connected second UEs.

At S2, if all the connected second UEs do not have the capability of CBR measurement on the resource pool, or all the connected second UEs have energy-saving requirements, that the serving node needs to provide a CBR measurement value is indicated in the UE status information sent to the serving node.

At S3, resource pool configuration and measurement configuration are obtained from the serving node.

At S4, if it is indicated in the resource pool configuration that the serving node cannot provide the CBR value of the target resource pool, a UE that can provide the CBR value is searched for through a broadcast message or multicast message and a connection is established with the UE.

At S5, the UE with which the unicast connection is established performs measurement on the resource pool.

Scenario 4: a first UE is in an IDLE status, an INACTIVE status or outside the coverage. The method includes following steps S1 to S5.

At S1, the first UE queries UE capability information and UE status information of all connected second UEs.

At S2, if all the connected second UEs do not have the capability of CBR measurement on the resource pool, or all the connected second UEs have energy-saving requirements, a UE that can provide the CBR value is searched for through a broadcast message or multicast message, and a connection is established with the UE.

At S3, the UE with which the unicast connection is established performs measurement on the resource pool.

In an embodiment of the present disclosure, an energy-saving method is provided, which is applied to a second communication node. The second communication node sends UE energy-saving information to a first communication node to provide the first communication node with a basis for energy-saving configuration, and then receives energy-saving configuration information and performs measurement on a target resource pool, thereby meeting the energy-saving requirements of the UE and reducing the power consumption of the UE.

Figure 2:
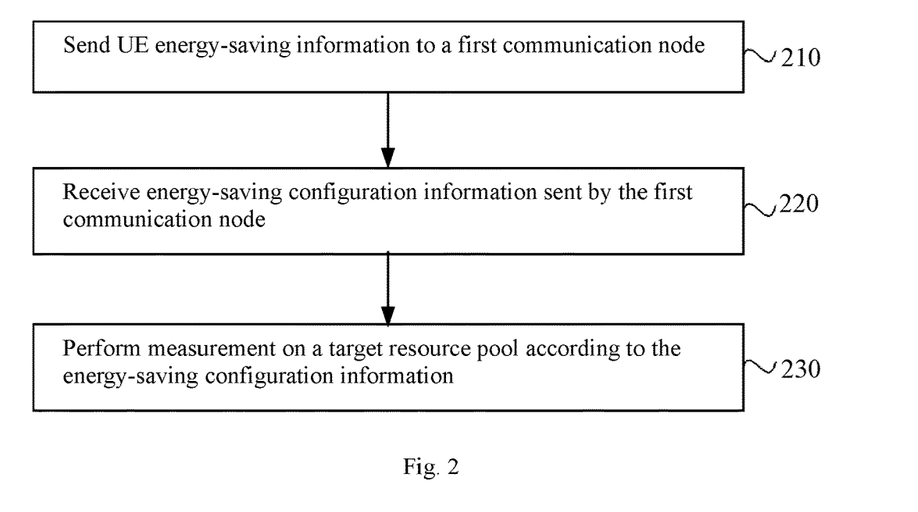
FIG. 2 is a flowchart of an energy-saving method provided by an embodiment.

FIG. 2 is a flowchart of an energy-saving method provided by an embodiment. As shown in FIG. 2, the method provided by this embodiment includes steps S210 to S230.

At S210, UE energy-saving information is sent to a first communication node.

At S220, energy-saving configuration information sent by the first communication node is received.

At S230, measurement is performed on a target resource pool according to the energy-saving configuration information.

In this embodiment, the operation performed by the second communication node corresponds to the operation performed by the first communication node in the above embodiments. For technical details not described in detail in this embodiment, please refer to any of the above embodiments.

In an embodiment, the first communication node is a serving node, and the second communication node is a target UE.

In an embodiment, the first communication node is a first UE, and the second communication node is a second UE.

In an embodiment, the method further includes a step S201.

At S201, UE capability query information sent by the first communication node is received, where the UE capability query information is utilized to query whether the second UE supports measurement on the target resource pool.

In an embodiment, the method further includes a step S202.

At S202, UE status query information sent by the first communication node is received through a PC5-S signaling in a unicast connection establishment stage; or UE status query information sent by the second communication node is received through a PC5 RRC message.

In an embodiment, S220 includes: in the case where the second UE has energy-saving requirements, receiving adjusted energy-saving configuration information, where the energy-saving configuration information includes at least one of: bearer configuration; transmission parameter configuration; or measurement configuration.

In an embodiment, the method further includes a step S240.

At S240, a measurement report is sent to the first communication node.

In an embodiment, the measurement report is sent through at least one of: an RRC message; or an MAC CE message.

In an embodiment, the energy-saving configuration information is sent through at least one of: an RRC message; or an MAC CE message.

In an embodiment, the number of the second UEs is at least two.

In an embodiment, the method further includes a step S250.

At S250, a response message is sent according to a broadcast message or multicast message from the first UE, where the response message is utilized to indicate that the second UE has CBR measurement capability.

The energy-saving method applied to the second communication node in this embodiment belongs to the same concept as the energy-saving configuration method applied to the first communication node in the above-mentioned embodiments. For technical details not described in detail in this embodiment, please refer to any of the above embodiments, and this embodiment has the same beneficial effect as executing the energy-saving configuration method.

Figure 3:
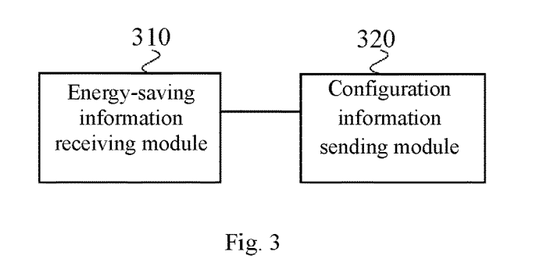
FIG. 3 is a schematic structural diagram of an energy-saving configuration apparatus provided by an embodiment.

An embodiment of the present disclosure provides an energy-saving configuration apparatus. FIG. 3 is a schematic structural diagram of an energy-saving configuration apparatus provided by an embodiment. As shown in FIG. 3, the energy-saving configuration apparatus includes an energy-saving information receiving module 310 and a configuration information sending module 320.

The energy-saving information receiving module 310 is configured to receive UE energy-saving information sent by a second communication node. The configuration information sending module 320 is configured to send energy-saving configuration information to the second communication node according to the UE energy-saving information. The energy-saving configuration apparatus of this embodiment can provide related energy-saving configuration information for the second communication node according to the UE energy-saving information of the second communication node, and flexibly instruct the second communication node to operate according to the energy-saving configuration information, thereby meeting the energy-saving requirements of the UE and reduce power consumption of the UE.

In an embodiment, the first communication node is a serving node, and the second communication node is a target UE.

In an embodiment, the UE energy-saving information includes at least one of UE capability information or UE status information. The UE capability information includes UE capability information of the target UE. The UE status information includes at least one of: UE status information of the target UE; UE capability information of a peer UE communicating with the target UE; and UE status information of the peer UE communicating with the target UE.

In an embodiment, the UE capability information of the target UE includes at least one of: a resource selection mode supported by the target UE, where the resource selection mode includes a random selection mode and a partial sensing mode; or whether the target UE supports measurement on a target resource pool, where the target resource pool includes at least one of: a transmission resource pool utilized for the target UE to transmit data; or a non-transmission resource pool not utilized for the target UE to transmit data.

In an embodiment, the UE status information of the target UE includes at least one of: a type of the target UE, where the type includes a Vehicle UE (V-UE) and a Pedestrian UE (P-UE); energy-saving requirement information of the target UE; an energy-saving level of the target UE; or whether the target UE requires the serving node to provide a Channel Busy Rate (CBR) value of the target resource pool.

In an embodiment, the UE status information of the peer UE includes at least one of: a type of the peer UE, where the type includes a V-UE and a P-UE; energy-saving requirement information of the RX UE; or an energy-saving level of the peer UE.

In an embodiment, the UE capability information of the peer UE includes at least one of: whether the peer UE supports measurement on the transmission resource pool; or whether the RX UE supports measurement on the non-transmission resource pool.

In an embodiment, the UE status information is transmitted through Sidelink UE information.

In an embodiment, the first communication node is a first UE, and the second communication node is a second UE.

In an embodiment, the UE energy-saving information includes at least one of UE capability information of the second UE or UE status information of the second UE.

In an embodiment, the UE energy-saving information includes UE capability information of the second UE. The UE capability information of the second UE includes whether the second UE supports measurement on the target resource pool, where the target resource pool includes at least one of: a transmission resource pool utilized for the second UE to transmit data; or a non-transmission resource pool not utilized for the second UE to transmit data.

In an embodiment, the apparatus further includes a capability query module configured to send UE capability query information to the second communication node, where the UE capability query information is utilized to query whether the second communication node supports measurement on the target resource pool.

In an embodiment, the UE energy-saving information includes UE status information of the second UE. The UE status information of the second UE includes at least one of: a type of the second UE, where the type includes a V-UE and a P-UE; energy-saving requirement information of the second UE; or an energy-saving level of the second UE.

In an embodiment, the energy-saving information receiving module 310 is configured to: receive UE status information sent by the second communication node through a Sidelink interface PC5-S signaling in a unicast connection establishment stage; or receive the UE status information sent by the second communication node through a PC5 RRC signaling.

In an embodiment, the apparatus further includes a status query module configured to send UE status query information to the second communication node through a PC5-S signaling in a unicast connection establishment stage; or send the UE status query information to the second communication node through a PC5 RRC message.

In an embodiment, the apparatus further includes an adjustment module configured to adjust the energy-saving configuration information in the case where the second UE has energy-saving requirements, where the energy-saving configuration information includes at least one of: bearer configuration; transmission parameter configuration; or measurement configuration.

In an embodiment, the energy-saving configuration information is determined by the first communication node according to a configuration of the serving node, a system message or pre-configured information.

In an embodiment, the energy-saving configuration information includes at least one of: resource pool configuration; or measurement configuration.

In an embodiment, the resource pool configuration includes a resource selection mode of a respective resource pool, where the resource selection mode includes a random selection mode and a partial sensing mode; whether a respective resource pool adopts a CBR measurement result issued by the serving node; a default CBR value of a respective resource pool; a default transmission parameter utilized by a respective resource pool; whether a respective resource pool is a non-transmission resource pool; and an identifier of a respective resource pool.

In an embodiment, the measurement configuration includes at least one of: measurement configuration information for Reference Signal Receiving Power (RSRP); measurement configuration information for CBR; a UE destination Identifier (ID) corresponding to the measurement configuration; or a UE destination ID list applicable to the measurement configuration.

In an embodiment, the measurement configuration information for RSRP includes at least one of: whether the measurement configuration information for RSRP is utilized for energy saving; or an energy-saving level applicable to the measurement configuration information for RSRP.

In an embodiment, the measurement configuration information for CBR includes at least one of: addition or removal of a measurement object configuration item; addition or removal of a measurement report configuration item; addition or removal of a measurement identifier configuration item; or a measurement parameter.

In an embodiment, the measurement identifier configuration item includes at least one of: a measurement ID; a measurement report ID; a measurement object ID; whether the measurement configuration information for CBR is utilized for energy saving; or an energy-saving level applicable to the measurement configuration information for CBR.

In an embodiment, the measurement report configuration item for CBR includes at least one of: a measurement report ID; a UE corresponding to the measurement report; a report cycle of CBR; a report trigger event of CBR, where the trigger event includes a first event and a second event, the first event includes a CBR value being greater than or equal to a first threshold, and the second event includes a CBR value being less than or equal to a second threshold; a threshold corresponding to the trigger event; a measurement parameter to be reported; a reporting mode, where the reporting mode includes reporting an index in a CBR range list and reporting a CBR value; a report destination; or a processing mode of multiple measurement results, where the processing mode includes reporting multiple measurement results or reporting one measurement result.

In an embodiment, the measurement object configuration item includes a measurement object ID; a target resource pool ID; a target resource pool configuration; and whether the target resource pool is a transmission resource pool.

In an embodiment, the measurement parameter includes a CBR value.

In an embodiment, the apparatus further includes a measurement report receiving module configured to receive a measurement report sent by the second communication node.

In an embodiment, the measurement report includes at least one of: a measurement ID; a measurement value of the measurement parameter; a CBR value; an index in a CBR range list; a destination ID of a UE reporting the measurement value; or location information of the UE reporting the measurement value.

In an embodiment, the measurement report is sent through at least one of: an RRC message; or an MAC CE message.

In an embodiment, the energy-saving configuration information is sent through at least one of: an RRC message; or an MAC CE message.

In an embodiment, the number of the second UEs is at least two. The configuration information sending module 320 is configured to: instruct one second UE to perform measurement on the target resource pool by sending a measurement configuration. Correspondingly, the measurement report of the second UE contains a CBR measurement value, and a transmission parameter corresponding to the CBR measurement value is utilized for data transmission of all the second UEs.

In an embodiment, the number of the second UEs is at least two. The configuration information sending module 320 is configured to: instruct at least two second UEs to perform measurement on the target resource pool by sending a measurement configuration. Correspondingly, the measurement report of each second UE contains a CBR measurement value, and a transmission parameter corresponding to each CBR measurement value is utilized for data transmission of a corresponding second UE.

In an embodiment, the apparatus further includes a selection module configured to select a maximum CBR value from the measurement reports of all second UEs as a CBR measurement result of the target resource pool; or a record module configured to record a CBR measurement value in the measurement report of each second UE and a set layer destination ID of each second UE, and select a CBR measurement value in a corresponding measurement report of the second UE as a CBR measurement result of the target resource pool in the process of data transmission.

In an embodiment, the apparatus further includes a UE selection module configured to select a UE with CBR measurement capability as the second UE through a broadcast message or a multicast message, and establish a connection with the second UE; and an instruction module configured to instruct the second UE to perform measurement on the target resource pool.

In an embodiment, the UE selection module is configured to: preferentially select a member UE in a group as the second UE in the case where there are multiple UEs with CBR measurement capability.

In an embodiment, the apparatus further includes a transmission module configured to transmit data according to a default CBR value or default transmission parameter provided by the transmission resource pool in the case where a CBR value of the transmission resource pool is not obtained; or autonomously determine a transmission parameter and transmit data according to the transmission parameter in the case where the CBR value of the transmission resource pool is not obtained.

The energy-saving configuration apparatus provided by this embodiment belongs to the same concept as the energy-saving configuration method provided by the above-mentioned embodiments. For technical details not described in detail in this embodiment, please refer to any of the above embodiments, and this embodiment has the same beneficial effect as executing the energy-saving configuration method.

Figure 4:
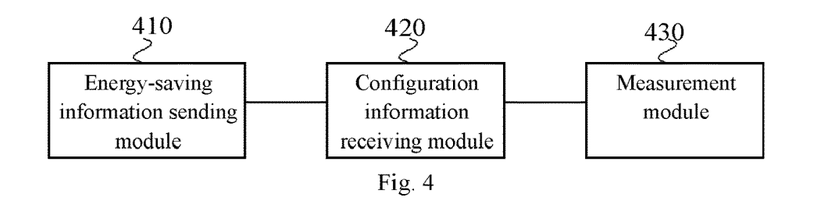
FIG. 4 is a schematic structural diagram of an energy-saving apparatus provided by an embodiment.

An embodiment of the present disclosure provides an energy-saving apparatus. FIG. 4 is a schematic structural diagram of an energy-saving apparatus provided by an embodiment. As shown in FIG. 4, the energy-saving apparatus includes an energy-saving information sending module 410, a configuration information receiving module 420 and a measurement module 430.

The energy-saving information sending module 410 is configured to send UE energy-saving information to a first communication node. The configuration information receiving module 420 is configured to receive energy-saving configuration information sent by the first communication node.

The measurement module 430 is configured to perform measurement on a target resource pool according to the energy-saving configuration information.

According to the energy-saving apparatus of this embodiment, UE energy-saving information is sent to the first communication node to provide the first communication node with a basis for energy-saving configuration, and then the energy-saving configuration information is received and measurement is performed on the target resource pool, thereby meeting the energy-saving requirements of the UE and reducing the power consumption of the UE.

In an embodiment, the first communication node is a serving node, and the second communication node is a target UE.

In an embodiment, the UE energy-saving information includes at least one of UE capability information or UE status information.

The UE capability information includes UE capability information of the target UE. The UE status information includes at least one of: UE status information of the target UE; UE capability information of a peer UE communicating with the target UE; and UE status information of the peer UE communicating with the target UE.

In an embodiment, the UE capability information of the target UE includes at least one of: a resource selection mode supported by the target UE, where the resource selection mode includes a random selection mode and a partial sensing mode; or whether the target UE supports measurement on a target resource pool, where the target resource pool includes at least one of: a transmission resource pool utilized for the target UE to transmit data; or a non-transmission resource pool not utilized for the target UE to transmit data.

In an embodiment, the UE status information of the target UE includes at least one of: a type of the target UE, where the type includes a Vehicle UE (V-UE) and a Pedestrian UE (P-UE); energy-saving requirement information of the target UE; an energy-saving level of the target UE; or whether the target UE requires the serving node to provide a Channel Busy Rate (CBR) value of the target resource pool.

In an embodiment, the UE status information of the peer UE includes at least one of: a type of the peer UE, where the type includes a V-UE and a P-UE; energy-saving requirement information of the peer UE; or an energy-saving level of the peer UE.

In an embodiment, the UE capability information of the peer UE includes at least one of: whether the peer UE supports measurement on the transmission resource pool; or whether the peer UE supports measurement on the non-transmission resource pool.

In an embodiment, the UE status information is transmitted through Sidelink UE information.

In an embodiment, the first communication node is a first UE, and the second communication node is a second UE.

In an embodiment, the UE energy-saving information includes at least one of UE capability information of the second UE or UE status information of the second UE.

In an embodiment, the UE energy-saving information includes UE capability information of the second UE. The UE capability information of the second UE includes whether the second UE supports measurement on the target resource pool. The target resource pool includes at least one of: a transmission resource pool utilized for the second UE to transmit data; or a non-transmission resource pool not utilized for the second UE to transmit data.

In an embodiment, the apparatus further includes a capability query information receiving module configured to receive UE capability query information sent by the first communication node, where the UE capability query information is utilized to query whether the second UE supports measurement on the target resource pool.

In an embodiment, the UE energy-saving information includes UE status information of the second UE. The UE status information of the second UE includes at least one of: a type of the second UE, where the type includes a V-UE and a P-UE; energy-saving requirement information of the second UE; or an energy-saving level of the second UE.

In an embodiment, the energy-saving information sending module 410 is configured to: send UE status information sent by the second communication node through a Sidelink interface PC5-S signaling in a unicast connection establishment stage; or send the UE status information sent by the second communication node through a PC5 RRC signaling.

In an embodiment, the apparatus further includes a status query information receiving module configured to receive UE status query information sent by the first communication node through a PC5-S signaling in a unicast connection establishment stage; or receive UE status query information sent by the second communication node through a PC5 RRC message.

In an embodiment, the configuration information receiving module 420 is configured to: receive adjusted energy-saving configuration information in the case where the second UE has energy-saving requirements, where the energy-saving configuration information includes at least one of: bearer configuration; transmission parameter configuration; or measurement configuration.

In an embodiment, the energy-saving configuration information is determined by the first communication node according to a configuration of the serving node, a system message or pre-configured information.

In an embodiment, the energy-saving configuration information includes at least one of: resource pool configuration; or measurement configuration.

In an embodiment, the resource pool configuration includes a resource selection mode of a respective resource pool, where the resource selection mode includes a random selection mode and a partial sensing mode; whether a respective resource pool adopts a CBR measurement result issued by the serving node; a default CBR value of a respective resource pool; a default transmission parameter utilized by a respective resource pool; whether a respective resource pool is a non-transmission resource pool; and an identifier of a respective resource pool.

In an embodiment, the measurement configuration includes at least one of: measurement configuration information for Reference Signal Receiving Power (RSRP); measurement configuration information for CBR; a UE destination Identifier (ID) corresponding to the measurement configuration; or a UE destination ID list applicable to the measurement configuration.

In an embodiment, the measurement configuration information for RSRP includes at least one of: whether the measurement configuration information for RSRP is utilized for energy saving; or an energy-saving level applicable to the measurement configuration information for RSRP.

In an embodiment, the measurement configuration information for CBR includes at least one of: addition or removal of a measurement object configuration item; addition or removal of a measurement report configuration item; addition or removal of a measurement identifier configuration item; or a measurement parameter.

In an embodiment, the measurement identifier configuration item includes at least one of: a measurement ID; a measurement report ID; a measurement object ID; whether the measurement configuration information for CBR is utilized for energy saving; or an energy-saving level applicable to the measurement configuration information for CBR.

In an embodiment, the measurement report configuration item for CBR includes at least one of: a measurement report ID; a UE corresponding to the measurement report; a report cycle of CBR; a report trigger event of CBR, where the trigger event includes a first event and a second event, the first event includes a CBR value being greater than or equal to a first threshold, and the second event includes a CBR value being less than or equal to a second threshold; a threshold corresponding to the trigger event; a measurement parameter to be reported; a reporting mode, where the reporting mode includes reporting an index in a CBR range list and reporting a CBR value; a report destination; or a processing mode of multiple measurement results, the processing mode including reporting multiple measurement results or reporting one measurement result.

In an embodiment, the measurement object configuration item includes a measurement object ID; a target resource pool ID; a target resource pool configuration; or whether the target resource pool is a transmission resource pool.

In an embodiment, the measurement parameter includes a CBR value.

In an embodiment, the apparatus further includes a report module configured to send a measurement report to the first communication node.

In an embodiment, the measurement report includes at least one of: a measurement ID; a measurement value of the measurement parameter; a CBR value; an index in a CBR range list; a destination ID of a UE reporting the measurement value; or location information of the UE reporting the measurement value.

In an embodiment, the measurement report is sent through at least one of: an RRC message; or an MAC CE message.

In an embodiment, the energy-saving configuration information is sent through at least one of: an RRC message; or an MAC CE message.

In an embodiment, the number of the second UEs is at least two.

In an embodiment, the apparatus further includes a response module configured to send a response message according to a broadcast message or a multicast message of the first UE, where the response message is utilized to indicate that the second UE has CBR measurement capability.

In an embodiment, the apparatus further includes a transmission module configured to transmit data according to a default CBR value or default transmission parameter provided by the transmission resource pool in the case where a CBR value of the transmission resource pool is not obtained; or autonomously determine a transmission parameter and transmit data according to the transmission parameter in the case where the CBR value of the transmission resource pool is not obtained.

The energy-saving apparatus provided by this embodiment belongs to the same concept as the energy-saving method provided by the above-mentioned embodiments. For technical details not described in detail in this embodiment, please refer to any of the above embodiments, and this embodiment has the same beneficial effect as executing the energy-saving configuration method.

Two options for a Hybrid Automatic Repeat reQuest (HARQ) feedback mechanism of UE are provided in the protocol: option 1 (HARQ feedback option 1) is that a peer UE only feeds back Non-Acknowledgement (NACK), and option 2 (HARQ feedback option 2) is that the peer UE feeds back ACK and NACK. The option 1 may be divided into a distance based HARQ feedback option 1 and a non-distance based HARQ feedback option 1. For the distance based HARQ feedback option 1, a TX UE may inform the RX UE of location information and a communication range, and the RX UE may calculate a communication distance between the RX UE and the TX UE according to their location information. If the distance is less than the communication range of the TX UE, the RX UE sends HARQ feedback; otherwise, the RX UE does not send HARQ feedback. However, in the case where the location information of the UE is unavailable, the TX UE does not know how to select the HARQ feedback mechanism (distance based option 1 or non-distance based option 1), and the RX UE does not know how to perform HARQ feedback, so the reliability of HARQ feedback is low.

Figure 5:
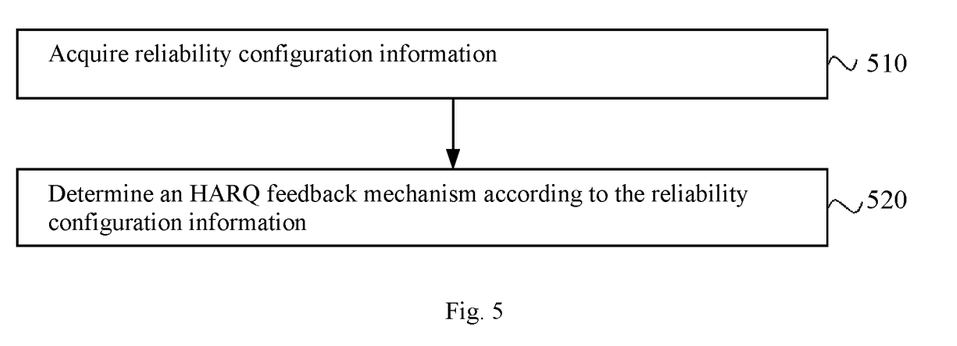
FIG. 5 is a flowchart of a feedback mechanism determination method provided by an embodiment.

In an embodiment of the present disclosure, a feedback mechanism determination method is provided, which is applied to a first UE (TX UE). An HARQ feedback mechanism is determined by acquiring reliability configuration information, so that the reliability of HARQ feedback is improved. FIG. 5 is a flowchart of a feedback mechanism determination method provided by an embodiment. As shown in FIG. 5, the method provided by this embodiment includes steps S510 and S520.

At S510, reliability configuration information is acquired.

At S520, an HARQ feedback mechanism is determined according to the reliability configuration information.

Illustration is made by the following example.

At S1, a first UE acquires reliability configuration information.

At S2, the first UE selects an HARQ option according to the reliability configuration information (i.e., selects non-distance based HARQ feedback option 1 or Disable HARQ Feedback), and the first UE first selects corresponding reliability configuration information according to at least one of the following information: Destination information, Sidelink Radio Bearer information, Logical Channel information, Resource Pool information, Quality of Service Flow (QoS Flow) information, or Communication Range information.

If the selected reliability configuration information is a value of reliability or priority, and if the reliability or priority of data of a logical channel with the highest priority in a generated MAC Protocol Data Unit (PDU) is greater than or equal to the value of the reliability or priority configured in the reliability configuration information, HARQ feedback is sent, that is, non-distance based HARQ feedback option 1 is selected; otherwise, HARQ feedback is not sent.

If the selected reliability configuration information is an interval of reliability or priority, and if the reliability or priority of the data of the logical channel with the highest priority in the generated MAC PDU is within the interval of reliability or priority configured in the reliability configuration information, HARQ feedback is sent; otherwise, HARQ feedback is not sent.

A feedback mechanism determination method of this embodiment, which is applicable to a first UE, includes the following items.

Item 1. Reliability configuration information is acquired; and an HARQ feedback mechanism is determined according to the reliability configuration information.

Item 2. According to item 1, the reliability configuration information is associated with at least one of the following information: destination information, Sidelink radio bearer information, logical channel information, resource pool information, quality of service flow information, or communication range information.

Item 3. According to item 1, the reliability configuration information has a granularity including at least one of: each UE, each Destination ID, each Sidelink radio bearer, each logical channel, each resource pool, each QoS flow, or each communication range.

Item 4. According to item 1, in the case where the reliability configuration information is type I (or referred to as first type) information, if the Reliability or Priority corresponding to data of a logical channel with the highest priority in a generated MAC PDU is greater than or equal to the type I information, HARQ feedback is sent; otherwise, HARQ feedback is not sent, where the type I information includes a value of Reliability or Priority; and in the case where the reliability configuration information is type II (or referred to as second type) information, if the Reliability or Priority corresponding to the data of the logical channel with the highest priority in the generated MAC PDU is within the range of the type II information, HARQ feedback is sent; otherwise, HARQ feedback is not sent, where the type II information includes an interval of Reliability or Priority.

Item 5. According to item 1, the reliability configuration information is configured by a base station, or is acquired through a system message, or is configured or pre-configured information.

Item 6. According to item 1, the reliability configuration information is carried in a Sidleink grant message.

Item 7. According to item 1, the reliability configuration information is configured or re-configured information.

In an embodiment of the present disclosure, a feedback mechanism determination method is provided, which is applied to a second UE (RX UE). An HARQ feedback mechanism is determined by acquiring reliability configuration information, and HARQ feedback is performed or no HARQ feedback is performed accordingly, so that the reliability of HARQ feedback is improved.

Figure 6:
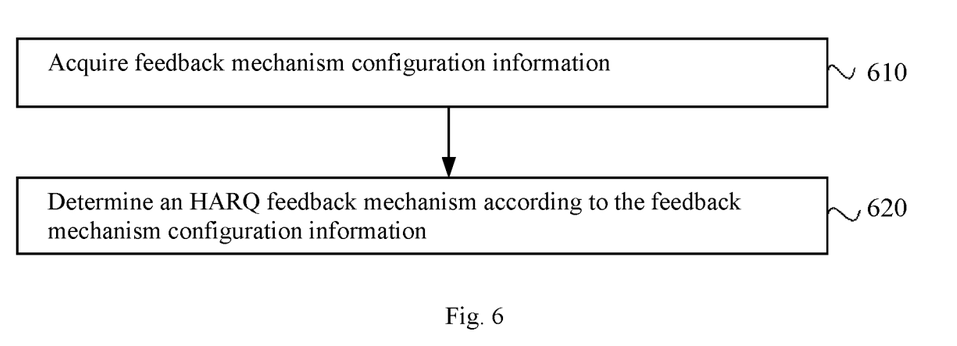
FIG. 6 is a flowchart of a feedback mechanism determination method provided by another embodiment.

FIG. 6 is a flowchart of a feedback mechanism determination method provided by another embodiment. As shown in FIG. 6, the method provided by this embodiment includes steps S610 and S620.

At 610, feedback mechanism configuration information is acquired.

At S620, an HARQ feedback mechanism is determined according to the feedback mechanism configuration information.

Illustration is made by the following examples.

Example One

At S1, a second UE acquires feedback mechanism configuration information, where the feedback mechanism configuration information includes reliability configuration information.

At S2, the second UE determines whether to perform HARQ feedback according to the reliability configuration information.

The first UE first selects corresponding reliability information according to at least one of the following information: Destination, sidelink radio bearer, logical channel, resource pool, QoS flow, or communication range.

If the selected reliability information is a Reliability/Priority/Packet Error Ratio (PER) value, and if the Reliability/Priority/PER of data of a logical channel with the highest priority in a received MAC PDU is greater than (or equal to) a configured Reliability/Priority/PER value, HARQ feedback is sent; otherwise, HARQ feedback is not sent.

If the selected reliability information is a Reliability/Priority/PER interval, and if the Reliability/Priority/PER of the data of the logical channel with the highest priority in the received MAC PDU is within the configured Reliability/Priority/PER interval, HARQ feedback is sent; otherwise, HARQ feedback is not sent.

Example Two

At S1, a second UE acquires feedback mechanism configuration information, where the feedback mechanism configuration information includes RSRP configuration information.

At S2, the second UE judges whether to perform HARQ feedback according to the RSRP configuration information and a measured RSRP value.

The second UE first selects RSRP configuration information according to at least one of the following information: Destination, sidelink radio bearer, logical channel, resource pool, QoS flow, or communication range.

If the selected RSRP configuration information is an RSRP value, and if the measured RSRP value is greater than (or equal to) the RSRP value, the UE sends HARQ feedback; otherwise, the UE does not send HARQ feedback.

If the configured RSRP information is an RSRP interval, and if the measured RSRP value is within the RSRP interval, the UE sends HARQ feedback; otherwise, the UE does not send HARQ feedback.

A feedback mechanism determination method of this embodiment, which is applicable to a second UE, includes the following items.

Item 1. Feedback mechanism configuration information is acquired; and an HARQ feedback mechanism is determined according to the feedback mechanism configuration information.

Item 2. According to item 1, the feedback mechanism configuration information includes reliability configuration information.

Item 3. According to item 1, the feedback mechanism configuration information includes RSRP related configuration information.

Item 4. According to item 2 or 3, the feedback mechanism configuration information is associated with at least one of the following information: destination information, sidelink radio bearer information, logical channel information, resource pool information, quality of service flow information, or communication range information.

Item 5. According to item 3, the feedback mechanism configuration information has a granularity including at least one of: each UE, each destination ID, each sidelink radio bearer, each logical channel, each resource pool, each QoS flow, and each communication range.

Item 6. According to item 2, in the case where the reliability configuration information is type I information, if the reliability or Priority corresponding to data of a logical channel with the highest priority in a generated MAC PDU is greater than or equal to the type I information, HARQ feedback is sent; otherwise, HARQ feedback is not sent, where the type I information includes a value of Reliability or Priority; and in the case where the reliability configuration information is type II information, if the Reliability or Priority corresponding to the data of the logical channel with the highest priority in the generated MAC PDU is within the range of the type II information, HARQ feedback is sent; otherwise, HARQ feedback is not sent, wherein the type II information includes an interval of Reliability or Priority.

Item 7. According to item 3, in the case where the RSRP-related configuration information is an RSRP value, if the measured RSRP value is greater than or equal to the RSRP value, HARQ feedback is sent; otherwise, HARQ feedback is not sent; and in the case where the RSRP-related configuration information is an RSRP interval, if the measured RSRP value is within the RSRP interval, HARQ feedback is sent; otherwise, HARQ feedback is not sent.

Item 8. According to item 1, the feedback mechanism configuration information is configured by a base station, or is acquired through a system message, or is configured or pre-configured information.

Item 9. According to item 1, the feedback mechanism configuration information is carried in Sidelink Control Information (SCI).

Item 10. According to item 1, a configuration mode of the feedback mechanism configuration information may be a value or an interval.

Item 11. According to item 1, the feedback mechanism configuration information is configured or re-configured information.

Figure 7:
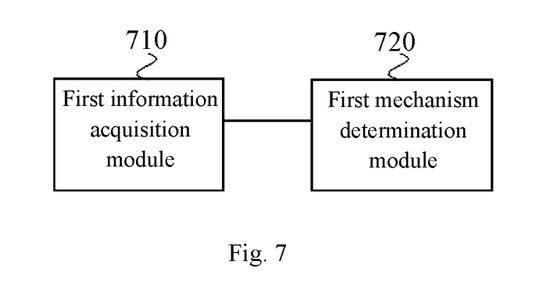
FIG. 7 is a schematic structural diagram of a feedback mechanism determination apparatus provided by an embodiment.

An embodiment of the present disclosure provides a feedback mechanism determination apparatus. FIG. 7 is a schematic structural diagram of a feedback mechanism determination apparatus provided by an embodiment. As shown in FIG. 7, the apparatus includes a first information acquisition module 710 and a first mechanism determination module 720.

The first information acquisition module 710 is configured to acquire reliability configuration information. The first mechanism determination module 720 is configured to determine an HARQ feedback mechanism according to the reliability configuration information.

According to the feedback mechanism determination apparatus of this embodiment, an HARQ feedback mechanism is determined by acquiring reliability configuration information, and a feedback mechanism is determined accordingly, so that the reliability of HARQ feedback is improved.

The feedback mechanism determination apparatus provided by this embodiment belongs to the same concept as the feedback mechanism determination method applied to the first UE provided by the above-mentioned embodiments. For technical details not described in detail in this embodiment, please refer to any of the above embodiments, and this embodiment has the same beneficial effect as executing the feedback mechanism determination method applied to the first UE.

Figure 8:
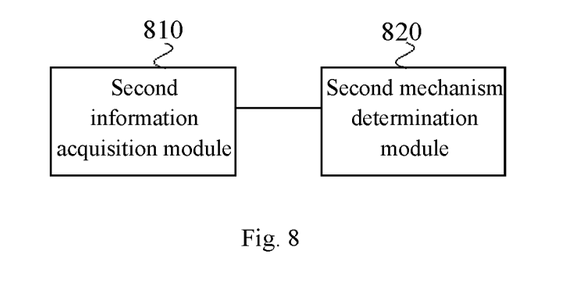
FIG. 8 is a schematic structural diagram of a feedback mechanism determination apparatus provided by another embodiment.

An embodiment of the present disclosure further provides a feedback mechanism determination apparatus. FIG. 8 is a schematic structural diagram of a feedback mechanism determination apparatus provided by another embodiment. As shown in FIG. 8, the apparatus includes a second information acquisition module 810 and a second mechanism determination module 820.

The second information acquisition module 810 is configured to acquire feedback mechanism configuration information. The second mechanism determination module 820 is configured to determine an HARQ feedback mechanism according to the feedback mechanism configuration information.

According to the feedback mechanism determination apparatus of this embodiment, an HARQ feedback mechanism is determined by acquiring reliability configuration information, and HARQ feedback or non-feedback is performed accordingly, so that the reliability of HARQ feedback is improved.

The feedback mechanism determination apparatus provided by this embodiment belongs to the same concept as the feedback mechanism determination method provided by the above-mentioned embodiments. For technical details not described in detail in this embodiment, please refer to any of the above embodiments, and this embodiment has the same beneficial effect as executing the feedback mechanism determination method applied to the second UE.

An embodiment of the present disclosure provides a communication node. The above-mentioned energy-saving configuration method can be executed by an energy-saving configuration apparatus. The energy-saving configuration apparatus can be implemented by software and/or hardware and integrated in the communication node. In this case, the communication node is a first communication node which may be a serving node (for example, a base station) or a first UE (TX UE).

Alternatively, the above-mentioned energy-saving method can be executed by an energy-saving apparatus. The energy-saving configuration apparatus can be implemented by software and/or hardware and integrated in the communication node. In this case, the communication node is a second communication node which may be a first UE (TX UE) or a second UE (RX UE).

Alternatively, the above-mentioned feedback mechanism determination method can be executed by a feedback mechanism determination apparatus. The feedback mechanism determination apparatus can be implemented by software and/or hardware and integrated in the communication node. In this case, the communication node may be a first UE (TX UE) or a second UE (RX UE).

Figure 9:
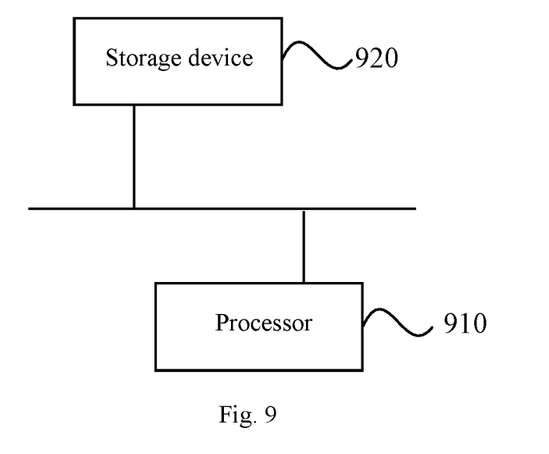
FIG. 9 is a schematic structural diagram of hardware of a communication node provided by an embodiment.

FIG. 9 is a schematic structural diagram of hardware of a communication node provided by an embodiment. As shown in FIG. 9, a communication node provided by this embodiment includes a processor 910 and a storage device 920. There could be one or more processors in the communication node. One processor 910 is taken as an example in FIG. 9. The processor 910 and the storage device 920 in the device are connected by a bus or other means, and connection by bus is taken as an example in FIG. 9.

The one or more programs, when executed by the one or more processors 910, cause the one or more processors to perform the energy-saving configuration method or energy-saving method described in any of the above-mentioned embodiments, or perform the feedback mechanism determination method described in any of the above-mentioned embodiments.

As a computer-readable storage medium, the storage device 920 in the communication node is configurable to store one or more programs which may be software programs, computer-executable programs or modules, such as program instructions/modules corresponding to the energy-saving configuration method in the embodiment of the present disclosure (for example, the modules in the energy-saving configuration apparatus shown in FIG. 3, including the energy-saving information receiving module 310 and the configuration information sending module 320). The processor 910 executes various functional applications and data processing of the communication node by running the software programs, instructions or modules stored in the storage device 920, that is, performs the energy-saving configuration method or energy-saving method in the above-mentioned method embodiments, or performs the feedback mechanism determination method in any one of the above-mentioned embodiments.

The storage device 920 may mainly include a program storage area and a data storage area. The program storage area may store an operating system, and an application program required for at least one function. The data storage area may store data and the like (such as UE energy-saving information, energy-saving configuration information, and the like in the above embodiments) created according to the use of the device. In addition, the storage device 920 may include a high-speed random-access memory, and may further include nonvolatile memory, such as at least one magnetic disk storage device, flash memory device, or other nonvolatile solid state storage device. In some examples, the storage device 920 may include memories remotely located with respect to the processor 910, and these remote memories may be connected to communication node through networks. Examples of the above networks include, but not limited to, the Internet, an intranet, a local area network, a mobile communication network and combinations thereof.

Moreover, the one or more programs included in the communication node, when executed by the one or more processors 910, cause the one or more processors 910 to perform the following operations: receiving UE energy-saving information sent by a second communication node; and sending energy-saving configuration information to the second communication node according to the UE energy-saving information.

Alternatively, the one or more programs included in the communication node, when executed by the one or more processors 910, cause the one or more processors 910 to perform the following operations: sending UE energy-saving information to a first communication node; receiving energy-saving configuration information sent by the first communication node; and performing measurement on a target resource pool according to the energy-saving configuration information.

Alternatively, the one or more programs included in the communication node, when executed by the one or more processors 910, cause the one or more processors 910 to perform the following operations: acquiring reliability configuration information; and determining an HARQ feedback mechanism according to the reliability configuration information.

Alternatively, the one or more programs included in the communication node, when executed by the one or more processors 910, cause the one or more processors 910 to perform the following operations: acquiring feedback mechanism configuration information; and determining an HARQ feedback mechanism according to the feedback mechanism configuration information.

The communication node provided by this embodiment belongs to the same concept as the energy-saving configuration method or energy-saving method or the feedback mechanism determination method provided by the above-mentioned embodiments. For technical details not described in detail in this embodiment, please refer to any of the above embodiments, and this embodiment has the same beneficial effect as executing the energy-saving configuration method or energy-saving method or the feedback mechanism determination method.

An embodiment of the present disclosure provides a non-transitory computer-readable storage medium storing a computer executable instruction which, when executed by a computer processor, cause the computer processor to perform an energy-saving configuration method or an energy-saving method or a feedback mechanism determination method.

The energy-saving configuration method includes: receiving UE energy-saving information sent by a second communication node; and sending energy-saving configuration information to the second communication node according to the UE energy-saving information.

The energy-saving method includes: sending UE energy-saving information to a first communication node; receiving energy-saving configuration information sent by the first communication node; and performing measurement on a target resource pool according to the energy-saving configuration information.

The feedback mechanism determination method includes: acquiring reliability configuration information; and determining an HARQ feedback mechanism according to the reliability configuration information.

Alternatively, the feedback mechanism determination method includes: acquiring feedback mechanism configuration information; and determining an HARQ feedback mechanism according to the feedback mechanism configuration information.

According to the above description of the embodiments, the present disclosure can be realized by means of software and general-purpose hardware, and can also be realized by hardware. Based on this understanding, the technical schemes of the present disclosure can be embodied in the form of software products, which can be stored in a computer-readable storage medium, such as a computer floppy disk, a Read-Only Memory (ROM), a Random Access Memory (RAM), a Flash Memory (FLASH), a hard disk or a Compact Disk (CD), etc., and include a plurality of instructions to make a computer device (which may be a personal computer, a server, or a network device, or the like) execute the method of any embodiment of the present disclosure.

The block diagrams of any logic flow in the drawings of the present disclosure may represent program steps, or may represent interconnected logic circuits, modules and functions, or may represent the combinations of program steps and logic circuits, modules and functions. The computer program can be stored on the memory. The memory may be of any type suitable for the local technical environment and can be implemented using any suitable data storage technology, such as but not limited to, a read only memory (ROM), a random-access memory (RAM), an optical memory device and system (Digital Versatile Disc (DVD) or a Compact Disk (CD)), etc. The computer-readable medium may include a non-transitory storage medium. The data processor may be of any type suitable for the local technical environment, such as but not limited to, a general-purpose computer, a special-purpose computer, a microprocessor, a Digital Signal Processor (DSP), an Application Specific Integrated Circuit (ASIC), a Field-Programmable Gate Array (FPGA) and a processor based on a multi-core processor architecture.

What is claimed is:

1. An energy-saving configuration method, which is applied to a first communication node, the method comprising:
    receiving User Equipment (UE) energy-saving information sent by a second communication node; and
    sending energy-saving configuration information to the second communication node according to the UE energy-saving information;
    wherein the first communication node is a serving node, and the second communication node is a target UE;
    wherein the energy-saving configuration information comprises resource pool configuration, and the resource pool configuration comprises a resource selection mode of a respective resource pool, wherein the resource selection mode comprises a random selection mode and a partial sensing mode;
    wherein the UE energy-saving information comprises at least one of UE capability information or UE status information;

the UE capability information comprises UE capability information of the target UE, wherein the UE capability information of the target UE comprises the random resource selection mode and the partial sensing mode; and the UE status information comprises at least one of:
UE status information of the target UE;
UE capability information of a peer UE communicating with the target UE; or
UE status information of the peer UE communicating with the target UE.

2. The method of claim 1, wherein the UE capability information of the target UE comprises:
whether the target UE supports measurement on a target resource pool, wherein the target resource pool comprises at least one of:
a transmission resource pool utilized for the target UE to transmit data; or
a non-transmission resource pool not utilized for the target UE to transmit data.

3. The method of claim 1, wherein the UE status information of the target UE comprises at least one of:
a type of the target UE, wherein the type comprises a Vehicle UE (V-UE) and a Pedestrian UE (P-UE);
energy-saving requirement information of the target UE;
an energy-saving level of the target UE; or
whether the target UE requires the serving node to provide a Channel Busy Rate (CBR) value of the target resource pool.

4. The method of claim 1, wherein the UE status information of the peer UE comprises at least one of:
a type of the peer UE, wherein the type comprises a V-UE and a P-UE;
energy-saving requirement information of the peer UE; or
an energy-saving level of the peer UE.

5. The method of claim 1, wherein the energy-saving configuration information comprises:
measurement configuration.

6. The method of claim 1, wherein the resource pool configuration comprises:
whether the respective resource pool adopts a Channel Busy Rate (CBR) measurement result issued by the serving node;
a default CBR value of the respective resource pool;
a default transmission parameter utilized by the respective resource pool;
whether the respective resource pool is a non-transmission resource pool; or
an identifier of the respective resource pool.

7. The method of claim 5, wherein the measurement configuration comprises at least one of:
measurement configuration information for Reference Signal Receiving Power (RSRP);
measurement configuration information for Channel Busy Rate (CBR);
a UE destination Identifier (ID) corresponding to the measurement configuration; or
a UE destination ID list applicable to the measurement configuration.

8. The method of claim 7, wherein the measurement configuration information for RSRP comprises at least one of:
whether the measurement configuration information for RSRP is utilized for energy saving; or
an energy-saving level applicable to the measurement configuration information for RSRP.

9. The method of claim 7, wherein:
the measurement configuration information for CBR comprises at least one of:
addition or removal of a measurement object configuration item;
addition or removal of a measurement report configuration item;
addition or removal of a measurement identifier configuration item; or
a measurement parameter;
the measurement report configuration item for CBR comprises at least one of:
a measurement report ID;
a UE corresponding to the measurement report;
a report cycle of CBR;
a report trigger event of CBR, wherein the trigger event comprises a first event and a second event, the first event comprises a CBR value being greater than or equal to a first threshold, and the second event comprises a CBR value being less than or equal to a second threshold;
a threshold corresponding to the trigger event;
a measurement parameter to be reported;
a reporting mode, wherein the reporting mode comprises reporting an index in a CBR range list and reporting a CBR value;
a report destination; or
a processing mode of multiple measurement results, wherein the processing mode comprises reporting multiple measurement results or reporting one measurement result; and the measurement object configuration item comprises:
a measurement object ID;
a target resource pool ID;
a target resource pool configuration; or
whether the target resource pool is a transmission resource pool.

10. The method of claim 9, wherein the measurement parameter comprises a CBR value.

11. The method of claim 5, further comprising:
receiving a measurement report sent by the second communication node, wherein the measurement report comprises at least one of:
a measurement Identifier (ID);
a measurement value of the measurement parameter;
a Channel Busy Rate (CBR) value;
an index in a CBR range list;
a destination ID of a UE reporting measurement value; or
location information of the UE reporting the measurement value.

12. A communication node, comprising:
at least one processor; and
a storage device configured to store at least one program, wherein the at least one program, when executed by the at least one processor, causes the at least one processor to perform the energy-saving configuration method of claim 1.

13. A non-transitory computer-readable storage medium, storing a computer program which, when executed by a processor, causes the processor to perform the energy-saving configuration method of claim 1.

14. An energy-saving method, which is applied to a second communication node, the method comprising:
sending User Equipment (UE) energy-saving information to a first communication node;
receiving energy-saving configuration information sent by the first communication node; and performing measurement on a target resource pool according to the energy-saving configuration information;

wherein the first communication node is a serving node, and the second communication node is a target UE;

wherein the energy-saving configuration information comprises resource pool configuration, and the resource pool configuration comprises a resource selection mode of a respective resource pool, wherein the resource selection mode comprises a random selection mode and a partial sensing mode;

wherein the energy-saving configuration information comprises resource pool configuration, and the resource pool configuration comprises a resource selection mode of a respective resource pool, wherein the resource selection mode comprises a random selection mode and a partial sensing mode;

wherein the UE energy-saving information comprises at least one of UE capability information or UE status information;

the UE capability information comprises UE capability information of the target UE, wherein the UE capability information of the target UE comprises the random resource selection mode and the partial sensing mode; and the UE status information comprises at least one of:
UE status information of the target UE;
UE capability information of a peer UE communicating with the target UE;
or
UE status information of the peer UE communicating with the target UE.

15. A communication node, comprising:
at least one processor; and
a storage device configured to store at least one program, wherein the at least one program, when executed by the at least one processor, causes the at least one processor to perform the energy-saving method of claim 14.

16. A non-transitory computer-readable storage medium, storing a computer program which, when executed by a processor, causes the processor to perform the energy-saving method of claim 14.

* * * * *